United States Patent
Forbes et al.

(10) Patent No.: US 9,316,517 B2
(45) Date of Patent: Apr. 19, 2016

(54) SYSTEM AND METHOD FOR COMBINING CO-LOCATED FLOWMETERS

(75) Inventors: Graham W. Forbes, Houston, TX (US); Kerry D. Groeschel, Houston, TX (US)

(73) Assignee: DANIEL MEASUREMENT AND CONTROL, INC., Houston, TX (US)

( * ) Notice: Subject to any disclaimer, the term of this patent is extended or adjusted under 35 U.S.C. 154(b) by 875 days.

(21) Appl. No.: 13/242,822

(22) Filed: Sep. 23, 2011

(65) Prior Publication Data

US 2013/0080080 A1    Mar. 28, 2013

(51) Int. Cl.
*G01F 7/00* (2006.01)
*G01F 1/66* (2006.01)

(52) U.S. Cl.
CPC ............ *G01F 1/667* (2013.01); *G01F 1/668* (2013.01); *G01F 7/00* (2013.01)

(58) Field of Classification Search
CPC ................................. G01F 1/667; G01F 7/00
USPC ............................................................ 702/48
See application file for complete search history.

(56) References Cited

U.S. PATENT DOCUMENTS

| | | | | |
|---|---|---|---|---|
| 4,102,186 A * | 7/1978 | Brown | ............... | G01F 1/667 73/861.27 |
| 5,396,524 A * | 3/1995 | Lyman | ............... | G21C 17/032 376/246 |
| 7,117,104 B2 * | 10/2006 | Urdaneta | ............... | G01F 1/66 702/48 |
| 7,752,919 B2 | 7/2010 | Straub, Jr. et al. | | |
| 2005/0066744 A1 | 3/2005 | Kupnik et al. | | |
| 2006/0278016 A1 | 12/2006 | Froehlich et al. | | |
| 2007/0220136 A1 * | 9/2007 | Raghunathan | ............... | B67D 1/06 709/224 |
| 2008/0208483 A1 | 8/2008 | Loose et al. | | |
| 2009/0211330 A1 | 8/2009 | Froehlich et al. | | |
| 2010/0005900 A1 * | 1/2010 | Straub, Jr. | ............... | G01F 1/667 73/861.18 |
| 2010/0005901 A1 * | 1/2010 | Groeschel | ............... | G01F 1/667 73/861.27 |
| 2010/0064821 A1 | 3/2010 | Nakabayashi et al. | | |

FOREIGN PATENT DOCUMENTS

| | | |
|---|---|---|
| CN | 102174887 A | 9/2011 |
| CN | 203069221 U | 7/2013 |
| JP | 2000241218 A | 9/2000 |
| KR | 20040056254 A | 6/2004 |

OTHER PUBLICATIONS

China Patent Office First Office Action dated Nov. 8, 2012 for Application No. 201220342789.5; 5 pages.
China Patent Office First Office Action dated Jan. 30, 2013 for Application No. 201220342789.5; 3 pages.
(Continued)

*Primary Examiner* — Hyun Park
(74) *Attorney, Agent, or Firm* — Conley Rose, P.C.

(57) ABSTRACT

A system and method for ultrasonic flow metering. In one embodiment, an ultrasonic flow metering system includes a passage for fluid flow and a plurality of ultrasonic flowmeters. Each of the ultrasonic flowmeters includes a pair of ultrasonic transducers, and a flow processor. The pair of ultrasonic transducers is configured to form a chordal path across the passage between the transducers. The flow processor is coupled to the ultrasonic transducers. The flow processor is configured to measure the fluid flow through the spool piece based on outputs of the transducers of all of the ultrasonic flowmeters.

22 Claims, 7 Drawing Sheets

(56) References Cited

OTHER PUBLICATIONS

International Application No. PCT/US2012/056532 International Search Report dated Dec. 6, 2012. 9 pages.
Sick Maihak GmbH, "FLOWSIC600 Ultrasonic Gas Flow Meter," Reute, Germany, Jan. 2010, 4 pages.
Cameron International Corporation, "Caldon® LEFM® 280Ci Ultrasonic Flow Meter," Houston, Texas, 2010, 6 pages.
Chinese Patent Application No. 201210245103.5, Office Action dated Aug. 4, 2014, (16 pages).
Australian Patent Application No. 2012312256, Examination Report dated Nov. 26, 2014, (3 pages).
Russian Patent Application No. 2014111080, Office Action dated Jun. 11, 2015 (11 pages).
Australian Patent Application No. 2012312256, Notice of Acceptance dated Apr. 16, 2015 (2 pages).
Canadian Patent Application No. 2,849,086, Office Action dated Sep. 1, 2015 (4 pages).
Chinese Patent Application No. 201210245103.5, Office Action dated Oct. 16, 2015, (8 pages).

* cited by examiner

SYSTEM AND METHOD FOR COMBINING CO-LOCATED FLOWMETERS

BACKGROUND

After hydrocarbons have been removed from the ground, the fluid stream (e.g., crude oil, natural gas) is transported from place-to-place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable, and in these situations flowmeters may be used.

Ultrasonic flowmeters are one type of flowmeter that may be used to measure the amount of fluid flowing in a pipeline. In an ultrasonic flowmeter, ultrasonic signals are sent back and forth across the fluid stream to be measured, and based on various characteristics of the ultrasonic signals a measure of fluid flow may be calculated. Ultrasonic flowmeters providing improved flow measurement accuracy are desirable.

SUMMARY

A system and method for ultrasonic flow metering is disclosed herein. In one embodiment, an ultrasonic flow metering system includes a passage for fluid flow and a plurality of ultrasonic flowmeters. Each of the ultrasonic flowmeters includes a pair of ultrasonic transducers, and a flow processor. The pair of ultrasonic transducers is configured to form a chordal path across the passage between the transducers. The flow processor is coupled to the ultrasonic transducers. The flow processor is configured to measure the fluid flow through the spool piece based on outputs of the transducers of all of the ultrasonic flowmeters.

In another embodiment, a method for measuring fluid flow includes determining, by a first ultrasonic flowmeter, a first flow velocity of fluid flowing through the first ultrasonic flowmeter. A second ultrasonic flowmeter determines a second flow velocity of fluid flowing through the second ultrasonic flowmeter. The first ultrasonic flowmeter produces a combined flow rate by combining the first and second flow velocities.

In a further embodiment, a computer-readable medium is encoded with instructions that when executed cause a processor of an ultrasonic flowmeter to determine a first flow velocity of fluid flowing through the first ultrasonic flowmeter. Additional instructions encoded on the medium cause the processor to retrieve from a co-located ultrasonic flowmeter a second flow velocity of fluid flowing through the co-located ultrasonic flowmeter. Yet further instructions encoded on the medium cause the processor to produce a combined flow rate by combining the first and second flow velocities.

NOTATION AND NOMENCLATURE

Figure 1:
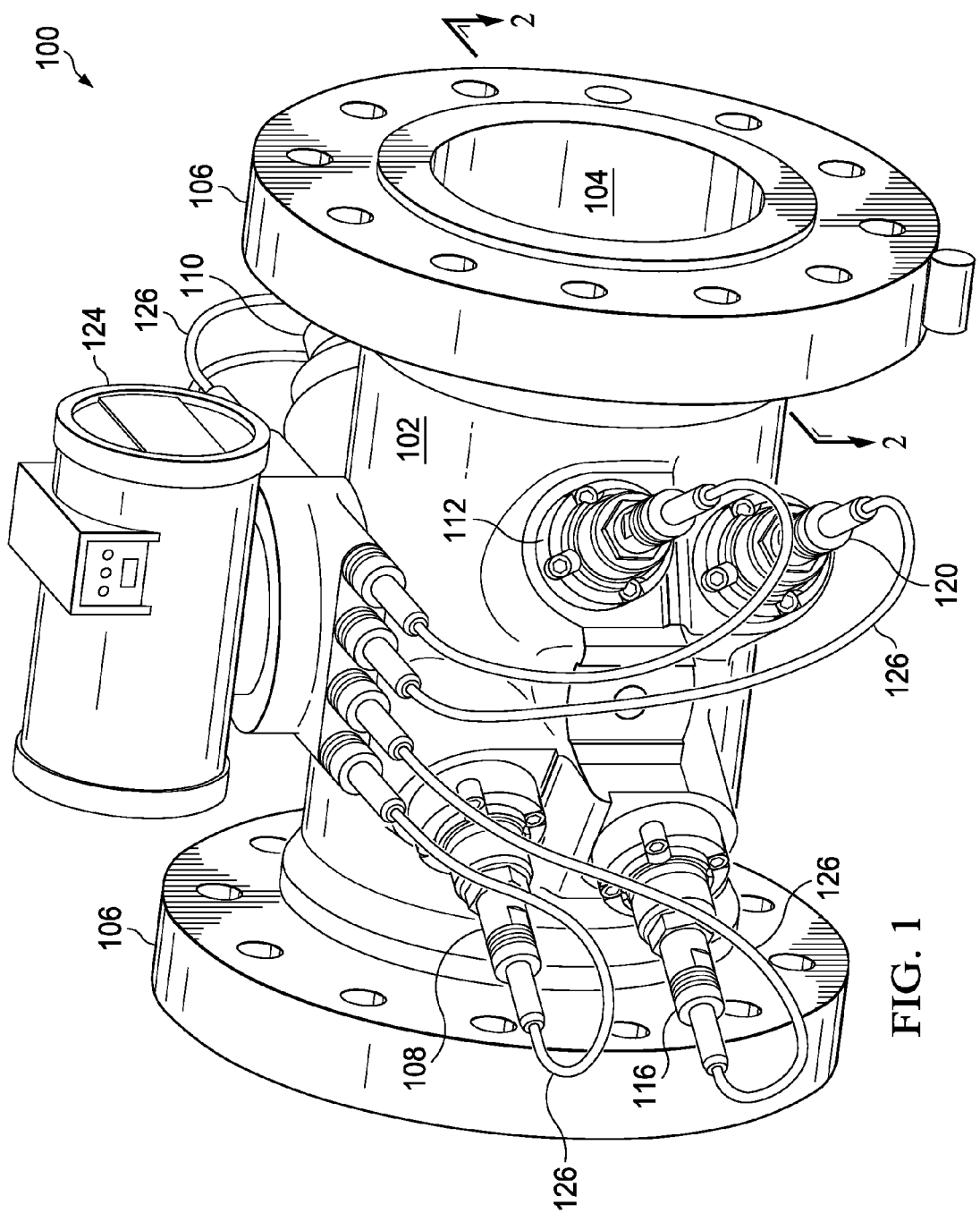
FIG. 1 shows an ultrasonic flowmeter in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The term "flow rate" as used herein refers to the rate of volumetric flow.

DETAILED DESCRIPTION

The following description is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow (e.g., cryogenic substances, water).

FIG. 1 shows an ultrasonic flowmeter 100 in accordance with various embodiments. The ultrasonic flowmeter 100 includes a meter body or spool piece 102 that defines a central passage or bore 104. The spool piece 102 is designed and constructed to be coupled to a pipeline or other structure (not shown) carrying fluids (e.g., natural gas) such that the fluids flowing in the pipeline travel through the central bore 104. While the fluids travel through the central bore 104, the ultrasonic flowmeter 100 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flowmeter 100 includes a plurality of transducer assemblies. In the view of FIG. 1 five such transducers assembles 108, 110, 112, 116 and 120 are in full or partial view. The transducer assemblies are paired (e.g., transducer assemblies 108 and 110), as will be further discussed below. Moreover, each transducer assembly electrically couples to control electronics, illustratively housed in enclosure 124. More particular, each transducers assembly electrical couples to the control electronics in the enclosure 124 by way of a respective cable 126 or equivalent signal conducting assembly.

Figure 2:
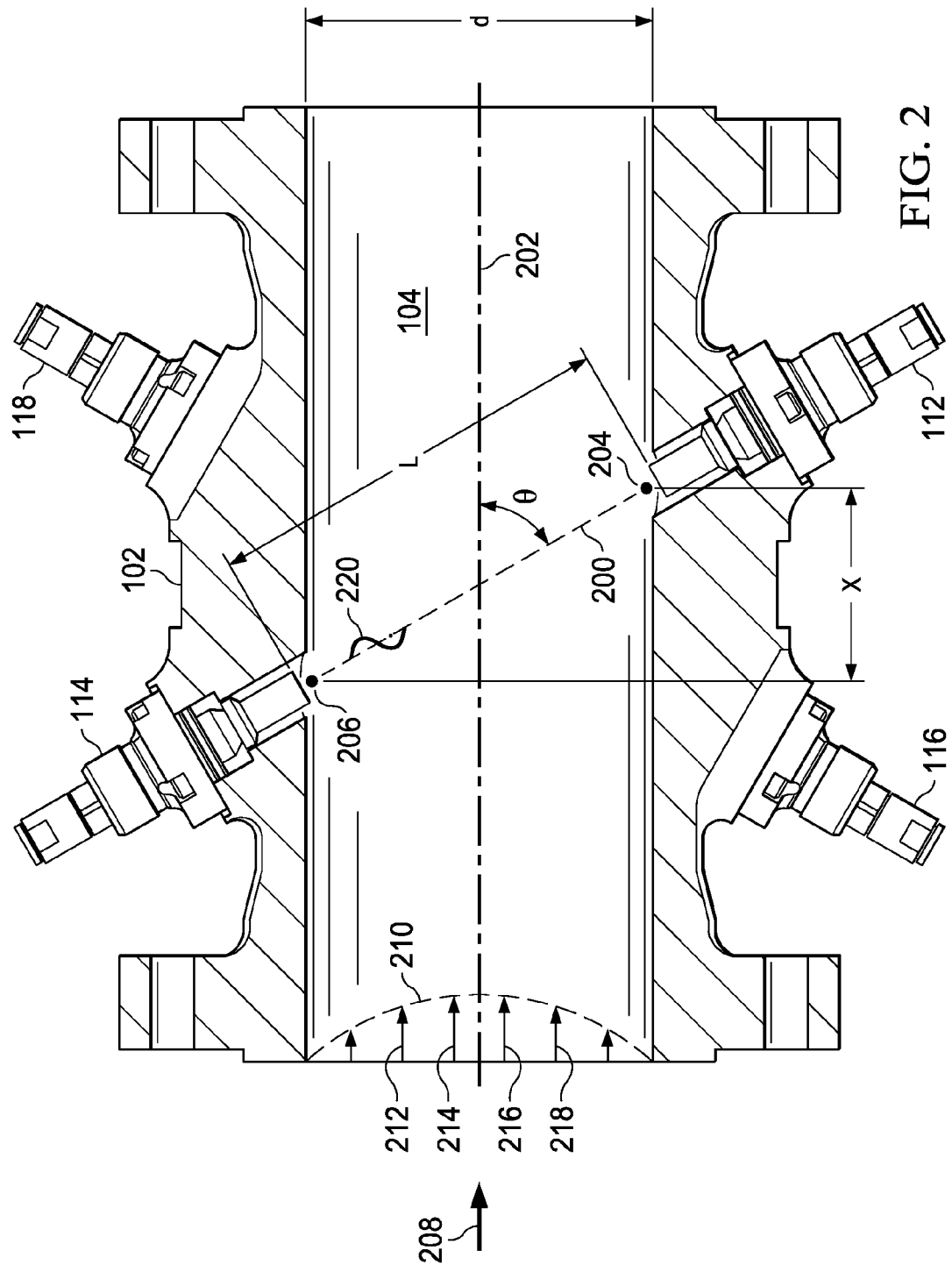
FIG. 2 shows a cross-sectional overhead view of an ultrasonic flowmeter in accordance with various embodiments.

FIG. 2 shows a cross-sectional overhead view of the ultrasonic flowmeter 100 taken substantially along line 2-2 of FIG. 1. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics associated with the flowmeter 100.

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length "d" corresponding to the pipe inside diameter. In most cases distances d, X and L are precisely determined during flowmeter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Some time later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flowmeter 100 carrying the fluid, the average velocity over the area of the central bore 104 may be used to find the volume of fluid flowing through the spool piece 102.

Figure 3:
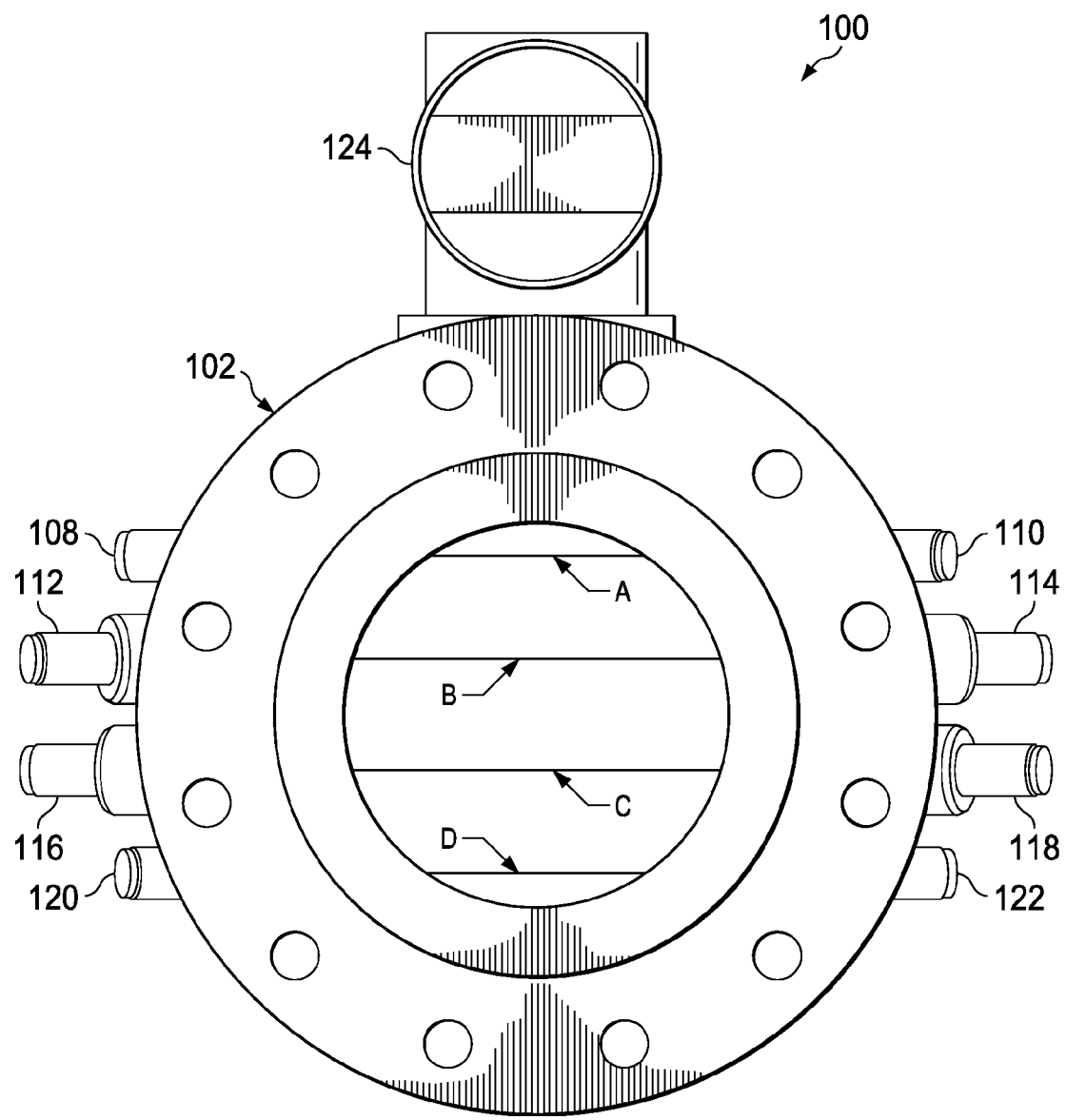
FIG. 3 shows an end elevation view of an ultrasonic flowmeter in accordance with various embodiments.

Ultrasonic flowmeters can have one or more chords. FIG. 3 illustrates an end elevation view of ultrasonic flowmeter 100. In particular, illustrative ultrasonic flowmeter 100 comprises four chordal paths A, B, C and D at varying levels within the spool piece 102. Each chordal path A-D corresponds to a transducer pair behaving alternately as a transmitter and receiver. Transducer assemblies 108 and 110 (only partially visible) make up chordal path A. Transducer assemblies 112 and 114 (only partially visible) make up chordal path B. Transducer assemblies 116 and 118 (only partially visible) make up chordal path C. Finally, transducer assemblies 120 and 122 (only partially visible) make up chordal path D.

Figure 4:
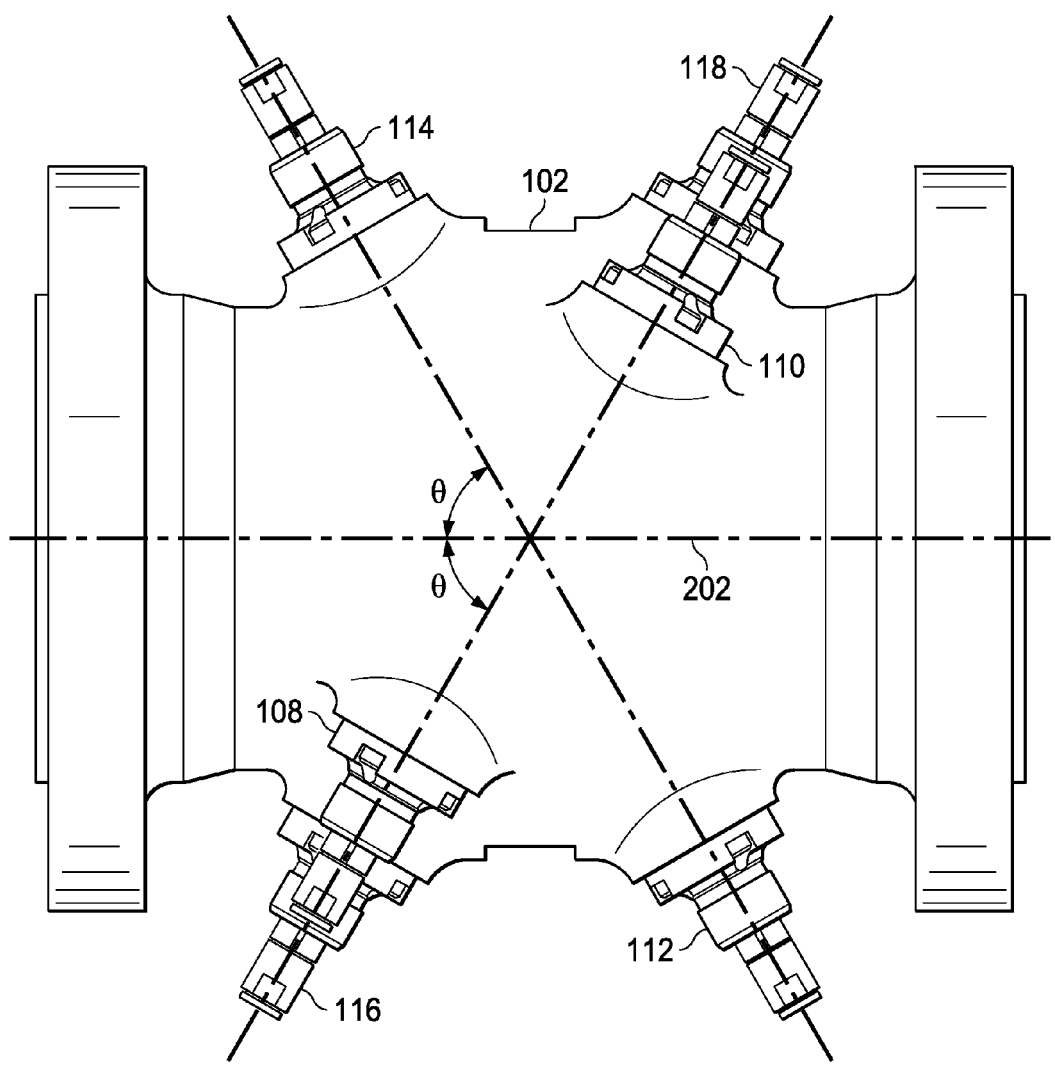
FIG. 4 shows an arrangement of transducer pairs of an ultrasonic flowmeter in accordance with various embodiments.

A further aspect of the arrangement of the four pairs of transducers is shown with respect to FIG. 4, which shows an overhead view. Each transducer pair corresponds to a single chordal path of FIG. 3; however, the transducer assemblies are mounted at a non-perpendicular angle to the center line 202. For example, a first pair of transducer assemblies 108 and 110 is mounted at a non-perpendicular angle θ to centerline 202 of spool piece 102. Another pair of transducer assemblies 112 and 114 is mounted so that the chordal path loosely forms the shape of an "X" with respect to the chordal path of transducer assemblies 108 and 110. Similarly, transducer assemblies 116 and 118 are placed parallel to transducer assemblies 108 and 110, but at a different "level" or elevation. Not explicitly shown in FIG. 4 is the fourth pair of transducer assemblies (i.e., transducer assemblies 120 and 122). Considering FIGS. 2, 3 and 4, the transducers pairs may be arranged such that the upper two pairs of transducers corresponding to chords A and B form an the shape of an "X", and the lower two pairs of transducers corresponding to chords C and D also form the shape of an "X". The flow velocity of the fluid may be determined at each chord A-D to obtain chordal flow velocities, and the chordal flow velocities are combined to determine an average flow velocity over the entire pipe. From the average flow velocity, the amount of fluid flowing in the spool piece, and thus the pipeline, may be determined.

Figure 5:
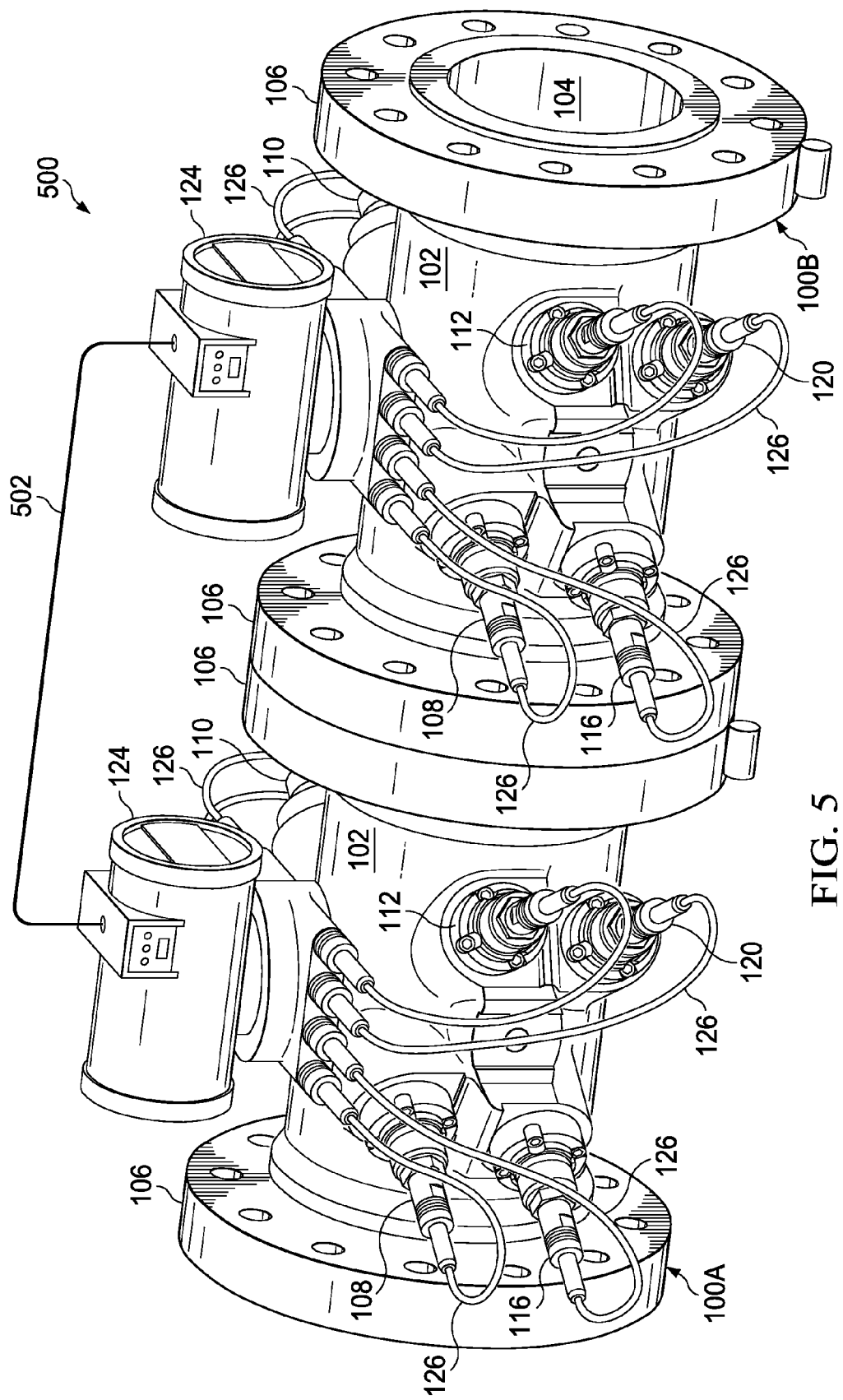
FIG. 5 shows a flow metering system including a pair of co-located ultrasonic flowmeters coupled in series in accordance with various embodiments.

Embodiments of the present disclosure couple a plurality of ultrasonic flowmeters (e.g., instances 100A/B of the flowmeter 100) to provide enhanced flow measurement accuracy. FIG. 5 shows a flow metering system 500 including a pair of co-located ultrasonic flowmeters 100 coupled in series. Other embodiments may include a different number of coupled co-located flowmeters and/or a different number of total or per flowmeter chordal paths. The electronics of the pair of flowmeters are communicatively coupled using a communication link 502, which may be a local area network (LAN). The electronics of each flowmeter 100 exchanges flow measurement values with the other flowmeter, and computes a combined flow rate value based on flow measurements provided by both meters 100. By combining the pair of four path meters 100, the system 500 forms an eight path flowmeter that provides improved measurement accuracy over each individual four path flowmeter 100 while allowing each flowmeter 100 to operate as a four path flowmeter 100 should the other flowmeter 100 fail. In some embodiments, the ultrasonic transducers of the two or more flowmeters 100 may be disposed in a single spool piece and/or the electronics of the two or meters may be disposed in a single enclosure. In further embodiments, the two or more flowmeters 100 may include different chordal configurations, for example, different chord elevations, angles, etc. relative to the flow path that provide for improved measurement accuracy when the measurements of the flowmeters 100 are combined.

Figure 6:
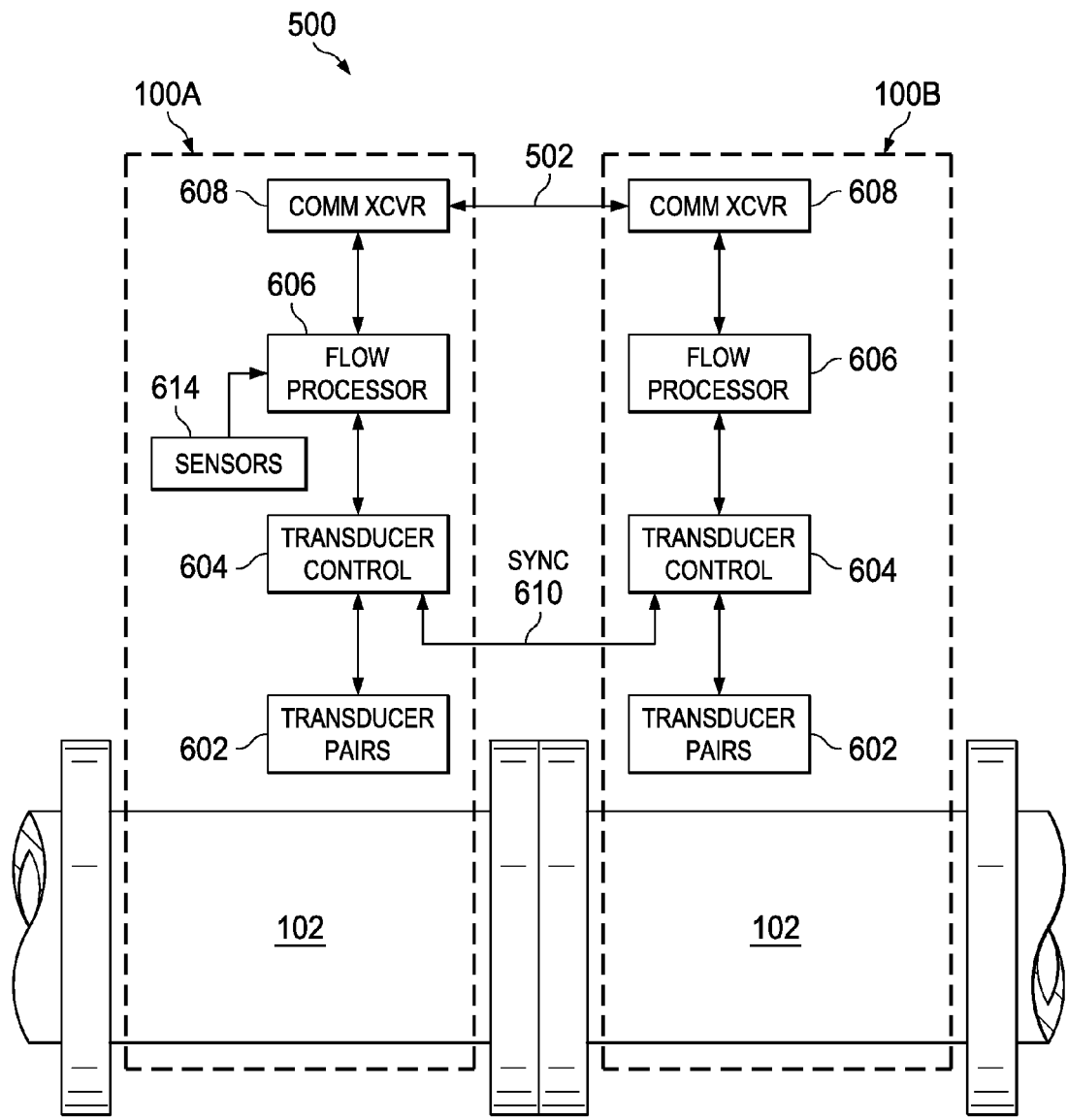
FIG. 6 shows a block a diagram of a flow metering system that includes co-located ultrasonic flowmeters in accordance with various embodiments.

FIG. 6 shows a block a diagram of the flow metering system 500 that includes co-located ultrasonic flowmeters 100A/B in accordance with various embodiments. Each of the flowmeters 100 includes a set of transducer a pairs 602 (e.g., 108 and 110, 112 and 114, 116 and 118, 120 and 122) and electronics comprising a transducer controller 604, a flow processor 606, and a communications transceiver 608. Some embodiments may also include one or more sensors 614 for measuring fluid attributes. The transducer controller 604 is coupled to the transducer pairs 602, and controls generation of ultrasonic signals by the transducer pairs 602 by, for example, generating drive signals that induce oscillation in the transducers. In some embodiments of the system 500, a transducer controller 604 of one of the flowmeters 100 generates a synchronization signal 610 that is provided to each of the transducer controllers 604 of the other flowmeters 100. The synchronization signal may be propagated by electrical conductors, optical channels, wireless channels, etc.

The synchronization signal 610 establishes the timing of ultrasonic signal generation by the meters 100, thereby preventing ultrasonic signals generated by flowmeter 100A from interfering with measurements made by flowmeter 100B and vice versa. In some embodiments, the signal 610 specifies the start time and duration for each transducer. In other embodiments, the signal 610, via phase, voltage level, etc. may indicate a time period in which each flowmeter 100 performs ultrasonic measurements free of interference from other meters 100. In some embodiments, the synchronization signal 610 is provided as a message transferred over a communication link, e.g., link 502, between the meters 100. Other embodiments of the system 500 may lack or selectively perform transducer synchronization, for example, in embodiments where interference is unlikely. In some embodiments, the ultrasonic flowmeter 100 that controls transducer timing by generation of the synchronization signal is termed "primary" and flowmeters 100 receiving the signal 610 are termed "secondary." The status of each flowmeter 100 as primary or secondary may be established when the flowmeter is manufactured or put into service.

The flow processor 606 is coupled to the transducer controller 604, and is configured to process outputs of the transducer pairs 602 to generate measurements of fluid flow within the spool piece 102. For a given chord, the chordal flow velocity v may be given by $$v = \frac{L^2}{2X} \cdot \frac{T_{up} - T_{dn}}{T_{up}T_{dn}}$$

where:
L is the path length (i.e., face-to-face separation between upstream and downstream transducers),
X is the component of L within the flowmeter bore in the direction of the flow, and
$T_{up}$ and $T_{dn}$ are the upstream and downstream transit times of sound energy through the fluid.

The flow processor 606 combines the chordal flow velocities to determine an average flow velocity for the fluid flowing through flowmeter 100, and computes the volumetric flow rate through the flowmeter 100 as a product of the average flow velocity for the flowmeter 100 and the cross-sectional area of the flowmeter 100.

The flow processor 606 may also compute an uncorrected flow rate and a corrected flow rate. The uncorrected flow rate adjusts the raw flow rate to account for the flow profile and fluid expansion due to pressure and temperature. The corrected flow rate adjusts the uncorrected flow rate to account for differences in base and flow condition pressure, temperature, and fluid compressibility.

Embodiments of the flow processor 606 are also configured to compute flow through the spool piece 102 by combining flow measurements provided by one flowmeter 100 with those provided by a different flowmeter 100. Thus, the flow processor 606 of each flowmeter 100 may be configured to produce combined flow measurement values based on flow measurements generated by all communicatively coupled flowmeters 100. The combined flow measurements may be more accurate than the flow measurements generated by any one of the meters 100 individually.

To generate a combined flow value, the flow processor 606 is configured to periodically (e.g., a periodic flow computation time interval—every 250 milliseconds (ms), every second, etc.) generate ultrasonic signals, and compute one or more initial flow values based on the outputs of the transducer pairs 602 controlled by the flowmeter (e.g., the flowmeter 100A). The initial flow values may include speed of sound along a chord, average speed of sound, flow velocity along a chord, average flow velocity, flow measurement quality, etc. The flow processor makes the initial flow values available for retrieval by other meters 100 in real-time (i.e., the time period (e.g., 250 ms) set for generating flow values by the meter 100 is unaffected by the retrieval and associated operations). In some embodiments, the flow processor 606 provides the initial flow values to a server disposed in the flowmeter 100A. The server is configured to process requests from another flowmeter 100 for the initial flow values computed by the flowmeter 100A, and provide the initial flow values to the other flowmeter 100 responsive to the request. The flow processor may also provide, for retrieval by other meters 100, an expiration time value that defines the time interval during which initial flow values are considered valid.

The flow processor 606 generates a message requesting initial flow values from a different flowmeter 100, and transmits the message via the communication transceiver 608. The transceiver 608 is communicatively linked to instances of the transceiver 608 in other meters 100. The transceiver 608 may be, for example, configure to provide communication in accordance with a networking standard, such as IEEE 802.3, IEEE 802.11, etc. The instance of the flowmeter 100 receiving the message (e.g., the flowmeter to which the message is addressed by internet protocol address) provides the requested initial flow values to the requesting flowmeter 100 via a message transferred over the communication link formed by the transceivers 608.

The flow processor 606 verifies the initial flow values received from the other flowmeter 100. For example, the flow processor 606 may verify that the expiration time value associated with the flow values has not expired, that a provided flow measurement quality value indicates valid measurements, that message check characters indicate valid data, etc. If the verification indicates that the initial flow values are valid, then the flow processor 606 combines the initial flow values provided by the other flowmeter 100 with the initial flow values computed by the flow processor 606 to generate a combined flow value. Some embodiments may combine the initial flow values by computing an average of the initial flow values generated by each flowmeter 100. The flow processor 606 may compute fluid flow rate (raw, corrected, uncorrected), flow volume, flow mass, etc. based on the combined flow value.

The flow processor 606 may store the combined flow value and/or the flow rate derived from the combined flow value in memory, provide the value to a database, and/or generate signals representative of flow rate, flow volume, etc. based on the combined flow value. For example, some embodiments of the flow processor 606 may generate an output signal having a frequency representative of a flow rate derived from the combined flow value.

If the flow processor 606 of the flowmeter 100A (or any flowmeter 100) is unable to verify the initial flow values received from another flowmeter 100, then the flow processor 606 may compute a final flow value based on only the initial flow values produced by the flowmeter 100A. Thus, the system 500 provides redundancy in that each flowmeter 100 can provide flow measurements based on the outputs of only the transducer pairs 602 of the flowmeter 100 when other instances of the flowmeter 100 fail, and provide enhanced flow measurement accuracy based on the outputs of all transducer pairs 602 when all of the meters 100 are operating properly.

Some embodiments of the flowmeter 100 also include sensors 614 that measure attributes of the fluid flowing in the spool piece 102. The sensors 614 may include, for example, one or more of a temperature sensor, a pressure sensor, and a gas composition sensor that measure fluid temperature, fluid pressure, and fluid composition respectively. The sensor measurement values may be shared between meters 100 as described above with regard to initial flow values. The meters 100 may apply the sensor measurement values to improve the accuracy of the computed flow values, flow rates, etc.

Various components of the flowmeter 100 including at least some portions of the flow processor 606 and the transducer controller 604 can be implemented using a processor, included in the flowmeter 100. The processor executes software programming that causes the processor to perform the operations described herein. In some embodiments, the flow processor 606 includes a processor executing software programming that causes the processor to generate flow values, such as the initial flow values, combined flow values, flow rates, etc., and perform other operations described herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming that causes a processor to perform the operations disclosed herein can be stored in a computer readable storage medium internal or external to the flowmeter 100. A computer readable storage medium comprises volatile storage such as random access memory, non-volatile storage (e.g., a hard drive, an optical storage device (e.g., CD or DVD), FLASH storage, read-only-memory, or combinations thereof.

Some embodiments can implement portions of the ultrasonic flowmeter 100, including portions of the flow processor 606 and transducer controller 604, using dedicated circuitry (e.g., dedicated circuitry implemented in an integrated circuit). Some embodiments may use a combination of dedicated circuitry and a processor executing suitable software. For example, some portions of the transducer controller 604 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 7:
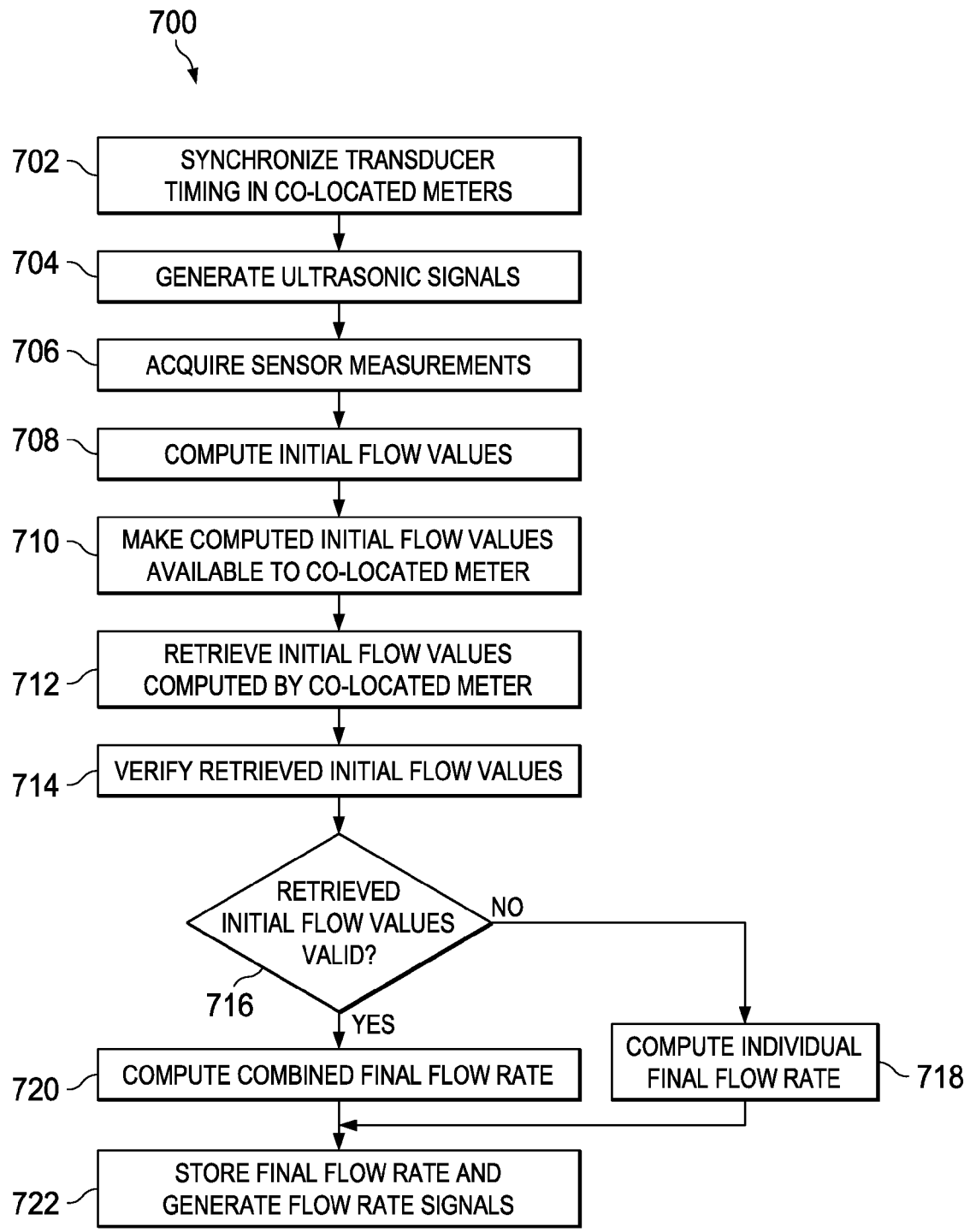
FIG. 7 shows a flow diagram for a method for operating a flow metering system that includes co-located ultrasonic flowmeters in accordance with various embodiments.

FIG. 7 shows a flow diagram for a method 700 for operating a flow metering system 500 that includes co-located ultrasonic flowmeters 100 in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 7, as well as other operations described herein, can be implemented as instructions stored in a computer readable medium and executed by processors included in the meters 100.

In the method 700, a plurality of ultrasonic flowmeters 100 are co-located (e.g., serially connected or disposed in a single spool piece) and each flowmeter 100 is generating flow values based on the ultrasonic transducer pairs 602 of all of the flowmeters. In block 702, the generation of ultrasonic signals by the transducers of the plurality of flowmeters 100 is synchronized to reduce interference between the flowmeters 100. One of the flowmeters 100 may be designated the primary flowmeter and generate the synchronization signal 610 that is provided to each of the other co-located flowmeters to effect the synchronization.

Each flowmeter 100 generates ultrasonic signals in block 704. The signals traverse the interior of the spool piece 102, and are detected by an ultrasonic transducer. Electrical signals representative of the detected ultrasonic signals are provided to the flow processor 606.

In block 706, sensors 614 measure attributes of the fluid flowing in the spool piece 102, such as fluid temperature, fluid pressure, fluid composition, etc. The attribute measurements are provided to the flow processor 606 for use in computing fluid flow.

In block 708, each flowmeter 100, computes a set of initial flow values. The initial flow values are based on the ultrasonic signals generated and detected only by the transducer pairs 602 of the flowmeter 100. In some embodiments, the initial flow values may also be based on the fluid attributes measured by the sensors. The initial flow values may include an average speed of sound, average flow velocity, flow rate value, etc. for the flowmeter 100.

In block 710, the initial flow values, and optionally the sensor measurements, are made accessible to co-located meters 100. For example, the initial flow values may be provided to a server in the flowmeter 100, and each of the co-located meters 100 operates as a client of the server to access the initial flow values via the communication link 502.

In block 712, each flowmeter 100 retrieves initial flow values from each other co-located flowmeter 100. Retrieval may include generating a request message that is communicated to each other flowmeter 100 (e.g., to a server included in each flowmeter 100). On receipt of the request message, each flowmeter 100 may generate a response message that includes the initial flow values, and transfer the response message to the requesting flowmeter 100.

In block 714, each flowmeter 100 verifies the initial flow values received from the other co-located meters 100. The verification may include computation of check values (such as cyclic redundancy check values) applied to the initial flow values, verification that a flow value lifetime value has not expired, and verification that the quality of the flow measurements exceeds a predetermined threshold.

In block 716, if a flowmeter 100 finds the retrieved initial flow values to be invalid, then, in block 718, the some embodiments of the flowmeter 100 compute a final flow rate value based only on the flow information generated by the flowmeter 100 (i.e., an individual final flow value). The individual final flow value is not based on initial flow values generated by other co-located meters 100. The flowmeter 100 also generates a fluid flow rate based on the individual final flow value.

If, in block 716, a flowmeter 100 finds the retrieved initial flow values to be valid, then, in block 720, the flowmeter 100 computes a final flow value based on the initial flow values generated by the plurality of co-located meters 100 (i.e., a combined final flow value). The flowmeter 100 applies the combined final flow value to generate a fluid flow rate based on the total number of chordal paths provided all of the co-located meters 100. The fluid flow rate may also be based on the sensor measurements retrieved from one or more of the co-located meters 100.

In block 722, the final flow value, which may be the individual or combined final flow rate explained above, and a flow rate based on the final flow value is stored for access by other components of the flow measurement system (e.g., access by a user interface/display/input sub-system or a flow control system). A signal representative of the flow rate may also be generated for communication of the flow rate to other equipment.

The above discussion is meant to be illustrative of various embodiments of the present invention. Numerous variations and modifications will become apparent to those skilled in the art once the above disclosure is fully appreciated. For example, while embodiments of the invention have been discussed with relation to a pair of co-located ultrasonic flowmeters, those skilled in the art will understand that embodiments are applicable to any number of co-located flowmeters. Furthermore, while embodiments have been discussed with regard to flowmeters having four chordal paths, those skilled in the art will understand that embodiments encompass flowmeters having any number of chordal paths, including co-located flowmeters each having a different number of chordal paths. It is intended that the following claims be interpreted to embrace all such variations and modifications.

What is claimed is:

1. An ultrasonic flow metering system, comprising:
a passage for fluid flow; and
a plurality of ultrasonic flowmeters, each flowmeter comprising:
   a plurality of pairs of ultrasonic transducers, each of the pairs configured to form a chordal path across the passage between the transducers; and
   a flow processor coupled to the ultrasonic transducers, and configured to:
      determine whether flow values provided to the flowmeter by each other of the flowmeters are valid; and
      generate, based on a determination that the flow values are valid, a measurement of the fluid flow through the passage based on ultrasonic signals received by the transducers of all of the flowmeters;
      generate initial flow measurements for the flowmeter that are not based on the flow values provided by any other of the flowmeters;
a server configured to:
   store the initial flow measurements; and
   provide the initial flow measurements to each of the other flowmeters responsive to reception of a request from each of the other of the flowmeters;
   wherein each of the flowmeters is configured to operate as a client and a server with respect to each other of the flowmeters.

2. The system of claim 1, wherein each flowmeter of the plurality of flowmeters further comprises a communication transceiver configured to communicatively couple the flowmeter to each of the other flowmeters of the plurality of flowmeters.

3. The system of claim 1, wherein each flowmeter of the plurality of flowmeters is configured to retrieve from each other flowmeter of the plurality of flowmeters a measurement of flow velocity determined by the other flowmeter; wherein the retrieval from each other flowmeter is constrained to a periodic flow computation time interval defined for each flowmeter.

4. The system of claim 1, wherein each flowmeter of the plurality of flowmeters is configured to compute a combined flow velocity based on flow velocities retrieved from each of the other flowmeters of the plurality of flowmeters.

5. The system of claim 4, wherein the combined flow velocity comprises an average of the flow velocities retrieved from each of the other flowmeters of the plurality of flowmeters.

6. The system of claim 4, wherein each flow processor is configured to compute at least one of a corrected flow rate and an uncorrected flow rate based on the combined flow velocity.

7. The system of claim 1, wherein each flowmeter of the plurality of flowmeters is configured to:
   generate, based on a determination that the flow values provided to the flowmeter are invalid, a flow measurement based on only outputs of the transducers of the flowmeter.

8. The system of claim 1, wherein each flowmeter of the plurality of flowmeters comprises a transducer controller that controls timing of ultrasonic signal generation by the transducers of the flowmeter; wherein the transducer controllers are configured to synchronize ultrasonic signal generation over the plurality of ultrasonic flowmeters.

9. The system of claim 1, wherein each flowmeter of the plurality of flowmeters comprises at least one sensor selected from a group consisting of a temperature sensor, a pressure sensor, and a gas composition sensor; and each flowmeter of the plurality of flowmeters is configured to:
   retrieve from a different flowmeter of the plurality of flowmeters a sensor measurement value generated by the at least one sensor, and
   compute a combined flow rate based on the sensor measurement value.

10. The system of claim 1, wherein each flowmeter of the plurality of flowmeters comprises a given number of chordal paths, and the flow processor of each flow meter of the plurality of flowmeters is configured to compute a combined flow rate based on more than the given number of chordal paths of the flowmeter.

11. A method for measuring fluid flow, comprising:
   determining, by a first ultrasonic flowmeter, a first flow velocity of fluid flowing through the first ultrasonic flowmeter;
   determining, by a second ultrasonic flowmeter, a second flow velocity of fluid flowing through the second ultrasonic flowmeter;
   transferring, by the second ultrasonic flowmeter, the second flow velocity to the first ultrasonic flowmeter;

appending to the second flow velocity, prior to the transferring, an expiration time value that specifies a time interval during which the second flow velocity is valid;

determining, by the first ultrasonic flowmeter, whether the second flow velocity is valid, wherein the determining comprises verifying that the expiration time appended to the second flow velocity has not expired; and producing a combined flow rate, by the first ultrasonic flowmeter, by combining the first and second flow velocities responsive to the second flow velocity being determined to be valid by the first ultrasonic flowmeter.

12. The method of claim 11, further comprising retrieving, by the first ultrasonic flowmeter, the second flow rate from the second ultrasonic flowmeter.

13. The method of claim 11, wherein producing a combined flow rate comprising determining at least one of a corrected flow rate and an uncorrected flow rate.

14. The method of claim 11, further comprising determining an average flow velocity based on the first flow velocity and the second flow velocity.

15. The method of claim 11, further comprising generating, by the first ultrasonic flowmeter, a flow rate of fluid flowing through the first ultrasonic flowmeter, based only on measurements of fluid flow through the first ultrasonic flowmeter, based on at least one of the first ultrasonic flowmeter being unable to retrieve the second flow rate from the second ultrasonic flowmeter and the second flow rate being invalid.

16. The method of claim 11, further comprising generating a synchronization signal, by the first ultrasonic flowmeter that synchronizes generation of ultrasonic signals by a plurality of transducers of the first and second ultrasonic signals.

17. The method of claim 11, further comprising generating by at least one of the first and second ultrasonic meters a sensor measurement comprising at least one of a temperature measurement, a pressure measurement, and a gas composition measurement of fluid flowing through the flowmeters, and wherein the combined flow rate is based on the sensor measurement.

18. A non-transitory computer-readable medium encoded with instructions that when executed cause a processor in a first ultrasonic flowmeter to:

determine a first flow velocity of fluid flowing through the first ultrasonic flowmeter;

store the first flow velocity in a server included in the first flow meter;

append to the first flow velocity an expiration time value that specifies a time interval during which the first flow velocity is valid;

provide the first flow velocity and the expiration time value to co-located ultrasonic flowmeter responsive to reception of a request for the first flow velocity from the co-located ultrasonic flowmeter; wherein the first ultrasonic flowmeter operates as a client and a server with respect to the co-located ultrasonic flowmeter;

retrieve from the co-located ultrasonic flowmeter a second flow velocity of fluid flowing through the co-located ultrasonic flowmeter;

determine whether the second flow velocity is valid by verifying that an expiration time appended to the second flow velocity by the co-located ultrasonic flowmeter has not expired wherein the expiration time specifies a time interval during which the second flow velocity is valid; and produce, based on a determination that the second flow velocity is valid, an average flow velocity by combining the first and second flow velocities.

19. The computer-readable medium of claim 18, further comprising instructions that when executed cause the processor in the first ultrasonic flowmeter to generate a combined flow rate based on the average flow velocity.

20. The computer-readable medium of claim 18, further comprising instructions that when executed cause the processor in the first ultrasonic flowmeter to generate a measurement of fluid volume flowing through the ultrasonic flowmeter, based only on measurements of fluid flow through the ultrasonic flowmeter, and based on at least one of the first ultrasonic flowmeter being unable to retrieve the second flow velocity from the co-located ultrasonic flowmeter and the second flow velocity being invalid.

21. The computer-readable medium of claim 18, further comprising instructions that when executed cause the processor in the first ultrasonic flowmeter to generate a synchronization signal that synchronizes generation of ultrasonic signals by a plurality of transducers of the first ultrasonic flowmeter and the co-located ultrasonic flowmeter.

22. The computer-readable medium of claim 18, further comprising instructions that when executed cause the processor in the first ultrasonic flowmeter to retrieve, from the co-located ultrasonic flowmeter, a sensor measurement comprising at least one of a temperature measurement, a pressure measurement, and a gas composition measurement of fluid flowing through the co-located ultrasonic flowmeter, and produce a combined flow rate based on the sensor measurement.

* * * * *